502-159 SR
4/7/87 OR RE 32,392

United States Patent [19]
Clark et al.
[11] E Patent Number: Re. 32,392
[45] Reissued Date of Patent: Apr. 7, 1987

[54] CATALYST PELLETS WITH RESIN BINDER FOR DECOMPOSITION OF HYPOCHLORITE

[75] Inventors: Roger T. Clark, Pottstown; David M. Gardner, Collegeville, both of Pa.

[73] Assignee: Pennwalt Corporation, Philadelphia, Pa.

[21] Appl. No.: 767,943

[22] Filed: Aug. 21, 1985

Related U.S. Patent Documents

Reissue of:
[64] Patent No.: 4,400,304
Issued: Aug. 23, 1983
Appl. No.: 216,042
Filed: Dec. 15, 1980

U.S. Applications:
[63] Continuation-in-part of Ser. No. 081,925, Oct. 4, 1979, abandoned.

[30] Foreign Application Priority Data

Mar. 15, 1981 [BE] Belgium ..... 888,204
Mar. 19, 1981 [DK] 03191981 ..... 1244/81

[51] Int. Cl.[4] ..... B01J 31/28; B01J 31/06; C08K 3/22; C02B 1/28

[52] U.S. Cl. ..... 502/159; 210/763; 264/122; 264/125; 264/126; 264/127; 423/497; 423/499; 502/402; 524/413; 524/431; 524/433; 524/435; 524/436; 524/545

[58] Field of Search ..... 502/159, 402; 210/754, 210/756, 763; 524/413, 431, 433, 435, 436, 545; 264/122, 125, 126, 127

[56] References Cited

U.S. PATENT DOCUMENTS

| | | | |
|---|---|---|---|
| 2,540,599 | 2/1951 | Segura | 502/159 |
| 3,051,662 | 8/1962 | Pitzer | 502/159 |
| 3,583,886 | 6/1971 | Baker, Jr. | 502/101 |
| 3,755,192 | 8/1973 | Rottig | 502/159 |
| 3,843,606 | 10/1974 | Van Sorge | 502/159 |
| 3,888,974 | 6/1975 | Stevens | 502/159 |
| 3,895,029 | 7/1975 | Ward | 524/431 |
| 3,935,159 | 1/1976 | Demillecamps et al. | 524/545 |
| 3,944,487 | 3/1976 | Davis et al. | 210/763 |
| 3,957,559 | 5/1976 | Hoffman, Jr. | 524/413 |
| 3,965,249 | 6/1976 | Kinosz | 423/497 |

FOREIGN PATENT DOCUMENTS

| | | | |
|---|---|---|---|
| 930093 | 7/1963 | United Kingdom | 502/159 |

*Primary Examiner*—P. E. Konopka

[57] ABSTRACT

A porous catalyst matrix used for the decomposition of aqueous hypochlorite solutions is disclosed along with the process for its use. The catalyst is prepared by sintering a powdered mixture of a particular metal oxide or hydroxide and a thermoplastic polyolefin or halogenated polyolefin.

5 Claims, No Drawings

CATALYST PELLETS WITH RESIN BINDER FOR DECOMPOSITION OF HYPOCHLORITE

Matter enclosed in heavy brackets [ ] appears in the original patent but forms no part of this reissue specification; matter printed in italics indicates the additions made by reissue.

This application is a Continuation-in-part from application Ser. No. 081,925, filed Oct. 4, 1979 now abandoned.

*This is an application for reissue of U.S. Pat. No. 4,400,304 granted Aug. 23, 1983.*

BACKGROUND OF THE INVENTION

Hypochlorite ions in aqueous solution are corrosive to many metals and are highly toxic to aquatic life. Industrial waste streams containing aqueous hypochlorite are produced by many processes such as in the manufacture of chlorine-caustic and dry bleach. Before these waste streams can be released into public waters, they require treatment to remove hypochlorite ions.

Various methods including photochemically-, thermally-, and chemically-induced decompositions have been proposed for removing hypochlorite from dilute aqueous solutions. For large scale industrial application, chemical methods are most commonly used. Chemical methods, which include the use of hydrogen peroxide, sodium hydrosulfide, hydrochloric acid and sulfur dioxide, or example, are all expensive when very large quantities of dilute aqueous hypochlorite are involved. Waste treatment systems which consume large quantities of these chemicals create a substantial economic burden on processes which they support.

There is a need for an ecologically efficient and economically sound method for decomposing large quantities of dilute hypochlorite. One basis for such a system is the decomposition of hypochlorite by heterogeneous fixed-bed catalysts to give chloride ion and oxygen. A number of such catalysts comprising the oxides and hydroxides of iron, copper, magnesium, nickel and cobalt have been described in the literature. Of these catalysts, those prepared from cobalt are the most active.

Because of certain practical drawbacks, fixed-bed catalysts have not seen widespread commercial application for hypochlorite decomposition. For example, the high alkalinity of hypochlorite solution causes the binder support of most tableted and extruded catalysts to disintegrate, reducing the catalyst totally, or in part, to a fine slurry. Because of the problems associated with recovery and recycle of finely divided catalyst particles in aqueous media, this technology has not seen widespread application. Also, when fixed-bed catalysts are exposed to waste solutions containing both calcium ions and hypochlorite, such as waste from dry bleach manufacture, the catalyst rapidly loses activity due to calcium carbonate deposition in the catalyst pores. Reactivation of blinded catalyst is difficult.

Accordingly, it is an object of this invention to provide an efficient and economically sound catalytic method of decomposing hypochlorite contained in aqueous industrial waste streams, including those containing dissolved and suspended calcium salts. A further object of this invention is to provide a catalyst for use in the present invention which is efficient, non-polluting and long-lived.

BRIEF DESCRIPTION OF THE INVENTION

This invention relates to catalyst pellets, capable of decomposing hypochlorite, which consists of a powdered active catalyst and a resin binder. The catalyst pellets of this invention are particularly suitable for treating waste waters containing hypochlorite in fixed beds and have improved resistance to disintegration compared to known tableted and extruded catalysts. The use of the catalyst described herein in fixed-bed decomposition of hypochlorite constitutes a second aspect of the present invention.

DETAILED DESCRIPTION OF THE INVENTION

The aqueous solutions containing hypochlorite which can be treated in accordance with the process of this invention and with the catalyst pellets described herein may be any aqueous solution which contains hypochlorite ions such as hypochlorous acid or salts of hypochlorous acids particularly the alkali metal and alkaline-earth metal salts.

While the description of our invention uses the term "catalyst pellets" it is to be understood that the catalyst can be used in particulate form as well as in the preferred pellet form.

One common source of aqueous streams containing hypochlorite ions is the waste water from scrubbing in a chlorine liquefaction plant where the non-condensable "tail gases" are scrubbed with caustic solution to prevent residual chlorine from entering the atmosphere. This scrubbing stream contains alkali metal hypochlorite which must be decomposed before discharge into public waters. Other sources of aqueous waste waters containing hypochlorite which can be treated by the method of the present invention occur in the manufacture of chlorine-caustic and dry bleach.

The method of treating various chemical streams in a fixed-bed reactor is well-known and does not, as such, constitute a part of this invention. Similarly, a variety of catalytic materials suitable for the decomposition of hypochlorite ion are known. The use of these materials are only a part of the present invention. It is the special form of the catalyst and its use in the decomposition of hypochlorite that forms the basis of this invention. In our invention, known catalysts for the decomposition of hypochlorite are combined with an organic thermoplastic resin binder to form a porous catalyst matrix in small paticle or pellet form which is then utilized in the known process of decomposing hypochlorite in a fixed bed.

Substances which are suitable for catalyzing the decomposition of hypochlorite include oxides or hydroxides of iron, copper, magnesium, nickel or cobalt. However, any substances serving this function can be adapted for use in the catalyst pellets described herein.

While these metal oxides and hydroxides can be used as such to prepare the novel catalysts of our invention, it is preferable to combine the metal oxides and hydroxides with a catalyst support. When combined with a catalyst support additional catalyst surface is exposed to the hypochlorite solutions and considerably greater catalytic activity and catalyst efficiency are obtained. The catalyst supports suitable for our new catalysts must be chemically resistant to the strong hypochlorite and strong alkaline solutions encountered in the decomposition of industrial aqueous hypochlorite solutions.

Among the materials suitable as catalyst supports are silica, diatomaceous earth, alkaline earth metal and alkali metal silicates; aluminas; silicates and mixed aluminum compounds of oxides, hydroxides and silicates; magnesia and mixed magnesium compounds of oxides, hydroxides and silicates. Mixtures of the various catalyst support materials can also be used.

The resin binder which forms the second essential component of the catalyst pellets of this invention can be any of a wide variety of solid thermoplastic organic resins. We have not found any thermosetting resins which are suitable for this invention. It is essential that the resin be relatively stable for long periods of time under contact with hypochlorite and strong alkali and that it be capable of forming a pellet which is not subject to mechanical or chemical degradation in use. This excludes resins which are susceptible to base attack such as epoxys, celluloses, phenolics, acetates, polyesters, etc. In particular, it has been found that solid thermoplastic polyolefins and halogenated polyolefins and their mixtures are suitable. Representative of these materials are polyethylene, polypropylene, polytetrafluoroethylene and polyvinylidene fluoride.

The ratio between the substance capable of decomposing hypochlorite and the organic resin binder can vary widely but generally will be within the ratio of 100:1 to 1:10. Ratios of 1:1 to 15:1 are generally preferred. The weight ratio of 2.3:1 to about 5:1 has been found to be suitable where the substance capable of catalyzing the decomposition of hypochlorite is cobalt oxide and the organic resin is any one of a variety of thermoplastic polyolefins. The essential criteria for selecting an appropriate ratio are that sufficient thermoplastic organic resin must be present in order to provide a matrix which is stable to mechanical handling and that the amount of organic resin is not in excess of that which will allow permeation of the catalyst pellets by the hypochlorite solution.

The size of the pellets is not extremely critical. Consideration should be given to ease of handling and the permeability of the pellets. Therefore, extremely large pellets are undesirable because of the possible difficulty of permeation by hypochlorite and the consequent efficient utilization of the catalyzing ingredient. Pellets in a cylindrical form having a diameter of about one-eighth inch and the length of about three-sixteenths of an inch have been found to be suitable for use in this invention. Smaller granular-type catalyst particles have also been used with greater efficiency than the pellets because of the relatively larger available surface area. The preferred particle size is 18–35 mesh.

The pellets are prepared so that finely divided catalysts for decomposing hypochlorite is intimately dispersed in the organic resin matrix. One method for accomplishing this is to grind powdered catalysts and powered organic resin, for example, in a ball-mill, forming the intimately mixed powdered composition into tablets or pellets by compacting them in a conventional machine and then sintering the pellets at or about the softening temperature of the organic resin. It is desirable that heating be conducted at a temperature high enough for sintering to take place but not so high that chemical degradation occurs or that the physical form of the pellet is destroyed. The granular-type catalyst particles have been made by crushing the pellets and sieving to a selected size range. An equivalent catalyst can be made directly by extrusion followed by sintering, thus eliminating compacting.

This invention can be used in decomposing hypochlorite waste liquors which contain calcium ion. This presents special problems since calcium ion apparently contributes to catalyst deactivation by depositing calcium carbonate in the pores of the catalyst. In a special aspect of this invention it has been found advantageous to remove calcium ion by precipitiation of the calcium as an insoluble salt, such as calcium carbonate, which is removed prior to allowing the hypochlorite solution to contact the catalyst. However, it is also possible to process hypochlorite solutions containing calcium ion directly and to periodically regenerate the catalyst.

The process of decomposing hypochlorite is generally conducted at ambient temperature to avoid the energy costs of heating the hypochlorite liquor. It is recognized, however, that the higher the temperature the greater is the catalyst activity obtained. The process is always conducted in the liquid phase.

The following Examples will further illustrate the preparation of the catalyst pellets of this invention and their use in a fixed-bed system for decomposition of hypochlorite solutions.

EXAMPLE 1

A silica-supported cobalt oxide powder was prepared by slowly precipitating cobalt hydroxide from an aqueous solution of cobalt nitrate containing suspended kieselguhr by the addition of base. The product was water-washed, dried and calcined at 450° C. for 2 hours. The resulting powder contained 35% cobalt by weight as cobalt oxide.

To 15 g of the above powder is added 5 g of polyvinylidene fluoride molding powder (Kynar 401). The mixture is placed in a size 000 ball mill along with ¼ full capacity of ceramic balls and milled for 1 hour. The powdered mixture is tableted into cylindrical tablets approximately ⅛ inch in diameter and 3/16ths inch long at 9,600 lbs/in$^2$ and the resulting tablets sintered in an oven at 180° C. for 1 hour. The polymer matrix tablets are very active for hypochlorite decomposition and retain their physical integrity indefinitely under reaction conditions.

A fixed-bed catalytic reactor was charged with 100 grams of catalyst. Simulated industrial hypochlorite waste liquor (prepared as described below) treated for removal of soluble calcium (0.499% available chlorine) was passed through the reactor at a rate of 2.25 mls/min. At 25° C. a vent solution containing 0.058% available chlorine was obtained, corresponding to an 88.5% conversion of hypochlorite to chloride ion and oxygen.

Simulated industrial hypochlorite waste liquor was prepared by dissolving 32.4 g of calcium hypochlorite (69.4% available chlorine), 166 g of sodium chloride, and 74.1 g of calcium chloride in 1000 ml. of distilled water. The resulting solution was clarified by settling and the hypochlorite content determined by titration with sodium thiosulfate (~1.25% available chlorine). Other concentrations were made by successive dilutions.

Calcium-free hypochlorite solution was prepared by treating the above simulated industrial hypochlorite waste liquor with a stoichiometric amount of sodium carbonate (one mole of carbonate per mole of calcium). The resulting suspension was clarified by settling and the clear supernatant liquor, after filtering, was treated with the catalyst.

EXAMPLE 2

This example is identical to Example 1 with the exception that nickel is substituted for cobalt.

EXAMPLE 3

This example is identical to Example 1 with the exception that polyethylene powder is substituted for polyvinylidene fluoride powder and the resulting tablets were sintered in an oven at 120° C. for 1 hour.

The resulting polymer matrix tablets are active for hypochlorite decomposition and retain their physical integrity indefinitely under reaction conditions.

EXAMPLE 4

This example is identical to Example 1 with the exception that tetrafluoroethylene is substituted for polyvinylidene fluoride powder and the resulting tablets were sintered in an oven at 270° C. for 1 hour.

The resulting polymer matrix tablets are active for hypochlorite decomposition and retain their physical integrity indefinitely under reaction conditions.

Catalyst samples prepared according to procedures described in Example 1 through 4 were evaluated using both 1% sodium hypochlorite solution (calcium free) and simulated industrial hypochlorite waste liquor. With 1% sodium hypochlorite solution, no fall-off in catalytic activity was measured over four weeks of continuous operation. No disintegration of the catalyst was noted and total cobalt in the vent liquor was less than 0.5 ppm.

When simulated industrial hypochlorite waste liquor was used as feed to the reactor, substantial catalytic activity was lost within 48 hours. Catalyst deactivation was attributed to calcium carbonate deposition in the pores of the catalyst. The catalyst activity was restored using the procedure described in Example 5.

EXAMPLE 5

A fixed-bed catalytic reactor of cross sectional area 2.5 $cm^2$ was charged with 100 grams (~100 $cm^3$) of the cobalt oxide/Kynar catalyst used in Example 1. Calcium-containing simulated industrial hypochlorite waste liquor (~1.25% available chlorine) prepared according to Example 1 was passed through the reactor at a rate of 2.5 mls/min (25° C.). After one day of continuous operation, 93% of the hypochlorite fed to the reactor was being converted to chloride ion and oxygen. After two days the conversion was 88%, after three days the conversion was 83%, after four days the conversion was 77% and after five days the conversion was 71%. At this point the catalyst was regenerated by purging with fresh water at a rate of 300 mls/min for three hours. Hypochlorite waste was again passed over the catalyst at a rate of 2.5 mls/min. Hypochlorite conversion after regeneration was 96.5%. Continous operation followed by regeneration when conversions fall below 80% was continued for 64 days with no indication that this procedure cannot be continued indefinitely without a loss of catalyst efficiency.

EXAMPLE 6

An alumina-supported cobalt oxide powder is prepared by co-precipitation of cobalt hydroxide and aluminum hydroxide from an aqueous solution of cobalt nitrate and aluminum nitrate by the addition of base. The product was water washed, dried and calcined at 450° C. for 2 hours. The resulting powder contained 25% cobalt by weight as cobalt oxide.

To 15 g of the above powder is added 5 g of polyvinylidene fluoride molding powder (Kynar 401). The mixture is placed in a size 000 ball mill along with ¼-full capacity of ceramic balls and milled for 1 hour. The powdered mixture is tableted into cylindrical tablets approximately ⅛ inch in diameter and 3/16 inch long at 9,600 lbs/$in^2$ and the resulting tablets sinttered in an oven at 180° C. for 1 hour. The polymer-matrix tablets are very active for hypochlorite decomposition and retain their physical integrity indefinitely under reaction conditions.

EXAMPLE 7

A silica-magnesia-supported cobalt oxide powder is prepared by impregnating a silica-magnesia powder (Davison SM-30) with aqueous cobalt nitrate and calcining at 400° C. for 2 hours. The resulting powder contains 30% cobalt by weight as cobalt oxide.

To 15 g of the above powder is added 5 g of polyvinylidene fluoride molding powder (Kynar 401). The mixture is placed in a size 000 ball mill along with ¼-full capacity of ceramic balls and milled for 1 hour. The powdered mixture is tableted into cylindrical tablets approximately ⅛ inch in diameter and 3/16 inch long at 9,600 lbs/$in^2$ and the resulting tablets sintered in an oven at 180° C. for 1 hour. The polymer matrix tablets are very active for hypochlorite decomposition and retain their physical integrity ibndefinitely under reaction conditions.

EXAMPLE 8

A magnesia-supported cobalt oxide powder is prepared by co-precipitation of cobalt hydroxide and magnesium hydroxide from an aqueous solution of cobalt nitrates and magnesium sulfate by the addition of base. The catalyst is water-washed, dried, and calcined at 400–450° C. for 2 hours.

To 15 g of the above powder is added 5 of polyvinylidene fluoride molding powder (Kynar 401). The mixture is placed in a size 000 ball mill along with ¼full capacity of ceramic balls and milled for 1 hour. The powdered mixture is tableted into cylindrical tablets approximately ⅛ inch in diameter and 3/16 inch long at 9,600 lbs/$in^2$ and the resulting tablets sintered in an oven at 180° C. for 1 hour. The polymer matrix tablets are very active for hypochlorite decomposition and retain their physical integrity indefinitely under reaction conditions.

What is claimed is:

1. A porous catalyst matrix [in pellet form] consisting essentially of a mixture of a powdered oxide or hydroxide of a metal selected from the group consisting of iron, copper, magnesium, nickel and cobalt, and a powdered thermoplastic organic resin [comprising polyvinylidene fluoride] *selected from the group consisting essentially of solid polyolefins and halogenated polyolefins and mixtures thereof* in a weight ratio of oxide or hydroxide of metal to resin within [1:1 to 15:1] *100:1 to 1:10*, which mixture of powders has been compacted into pellets and then thermally sintered at or about the softening temperature of the resin, thereby forming a porous [ctalyst] *catalyst* matrix [in pellet form] which is stable in aqueous hypochlorite solutions.

2. The porous catalyst matrix [in pellet form] of claim 1 *in pellet form* in which the pellet size is about one-eight of an inch in diameter and three-sixteenths of an inch in length.

3. The porous catalyst matrix of claim [1] *2* in which the pellets have been crushed and screened to a particle size of 18 to 35 mesh.

*4. The porous catalyst matrix of claim 1 in which the powdered thermoplastic solid organic resin is selected from the group consisting essentially of polyvinylidene fluoride, polyethylene, polypropylene, polytetrafluoroethylene, and mixtures thereof.*

*5. The porous catalyst matrix of claim 4 wherein the powdered oxide or hydroxide of said metal is supported with a catalyst support material selected from the group of materials consisting essentially of silica, diatomaceous earth, alkaline earth metal and alkali metal silicates; aluminas; silicates and mixed aluminum compounds of oxides, hydroxides and silicates; magnesia and mixed magnesium compounds of oxides, hydroxides, silicates and mixtures thereof.*

* * * * *